(12) United States Patent
Owen et al.

(10) Patent No.: US 12,423,286 B2
(45) Date of Patent: Sep. 23, 2025

(54) AUDIT LOGGING FOR INPUT TABLES ON A DATA WAREHOUSE

(71) Applicant: SIGMA COMPUTING, INC., San Francisco, CA (US)

(72) Inventors: Gregory G. Owen, San Mateo, CA (US); Stipo Josipovic, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/189,175

(22) Filed: Mar. 23, 2023

(65) Prior Publication Data

US 2024/0320205 A1 Sep. 26, 2024

(51) Int. Cl.
*G06F 16/907* (2019.01)
*G06F 16/22* (2019.01)
*G06F 16/25* (2019.01)

(52) U.S. Cl.
CPC ........ *G06F 16/2272* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 10,534,768 B2 | 1/2020 | Madhavarapu et al. | |
| 2003/0217033 A1* | 11/2003 | Sandler | G06F 16/2272 |
| 2005/0097187 A1* | 5/2005 | Thompson | G06F 16/252 |
| | | | 709/219 |
| 2017/0277743 A1* | 9/2017 | Jain | G06F 16/1873 |
| 2021/0042310 A1* | 2/2021 | Frantz | G06F 16/283 |
| 2021/0103583 A1* | 4/2021 | Kumar R C | G06F 16/2379 |

OTHER PUBLICATIONS

International Search Report and Written Opinion, PCT/US2024/020834, Jul. 12, 2024, 13 pages.

* cited by examiner

*Primary Examiner* — Thu N Nguyen

(57) ABSTRACT

Audit logging for input tables on a data warehouse including: receiving, by a workbook manager from a client computing system, a modification to an input table of a plurality of input tables stored in a cloud-based data warehouse; and storing, by the workbook manager, in an audit table stored in the cloud-based data warehouse, an entry describing the modification to the input table, wherein the audit table is configured to store entries describing modifications to any of the plurality of input tables.

18 Claims, 5 Drawing Sheets

AUDIT LOGGING FOR INPUT TABLES ON A DATA WAREHOUSE

BACKGROUND

Field of the Invention

The field of the invention is data processing, or, more specifically, methods, apparatus, and products for audit logging for input tables on a data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for audit logging for input tables on a data warehouse including receiving, by a workbook manager from a client computing system, a modification to an input table of a plurality of input tables stored in a cloud-based data warehouse; and storing, by the workbook manager, in an audit table stored in the cloud-based data warehouse, an entry describing the modification to the input table, wherein the audit table is configured to store entries describing modifications to any of the plurality of input tables.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
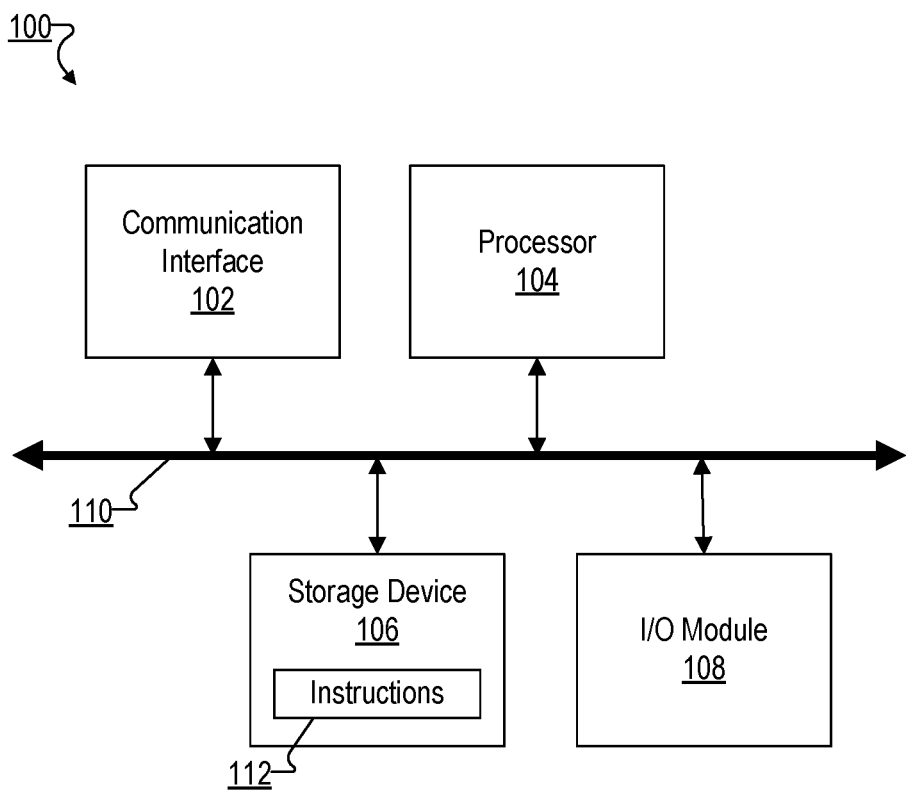
FIG. 1 sets forth a block diagram of an example system configured for audit logging for input tables on a data warehouse according to embodiments of the present invention.

Example methods, apparatus, and products for audit logging for input tables on a data warehouse in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
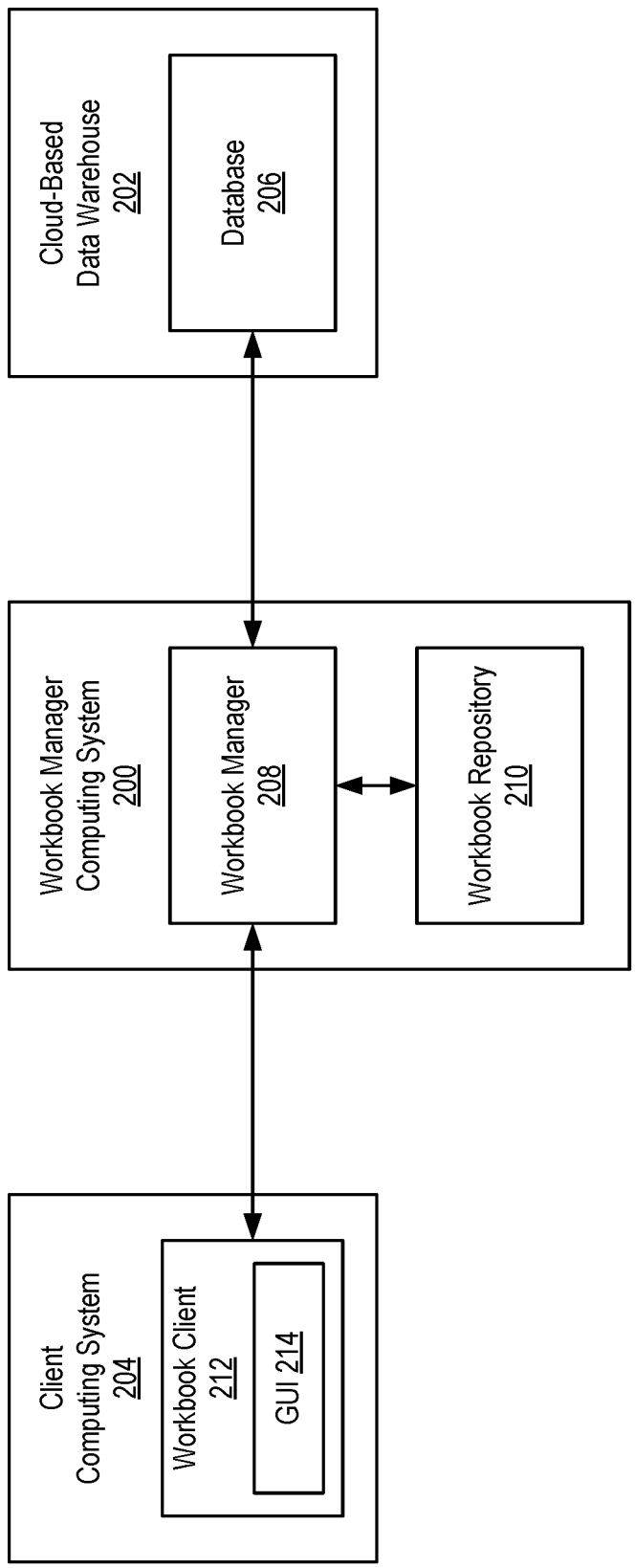
FIG. 2 sets forth a block diagram of an example system configured for audit logging for input tables on a data warehouse according to embodiments of the present invention.

For further explanation, FIG. 2 illustrates a block diagram depicting an exemplary system for audit logging for input tables on a data warehouse according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages client data on behalf of the client. The client (e.g., via the client computing system 204) accesses the data via the workbook manager 208, which organizes and analyzes the data as datasets within a workbook. The workbook manager 208 may access the client data from the cloud-based data warehouse 202 using credentials supplied by the client.

A workbook is a presentation of data from a cloud-based data warehouse 202 (e.g., using one or workbook elements). To present data from the cloud-based data warehouse 202, the data is retrieved from the database 206 (e.g., using a database statement) and organized using a dataset. A dataset is a collection of information that resides on the workbook manager computing system 200 that includes instructions for the retrieval and organization of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse. A workbook may include one or more workbook elements. Each workbook element includes a collection of graphical elements and organizing mechanism for a dataset or portion of a dataset. Workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
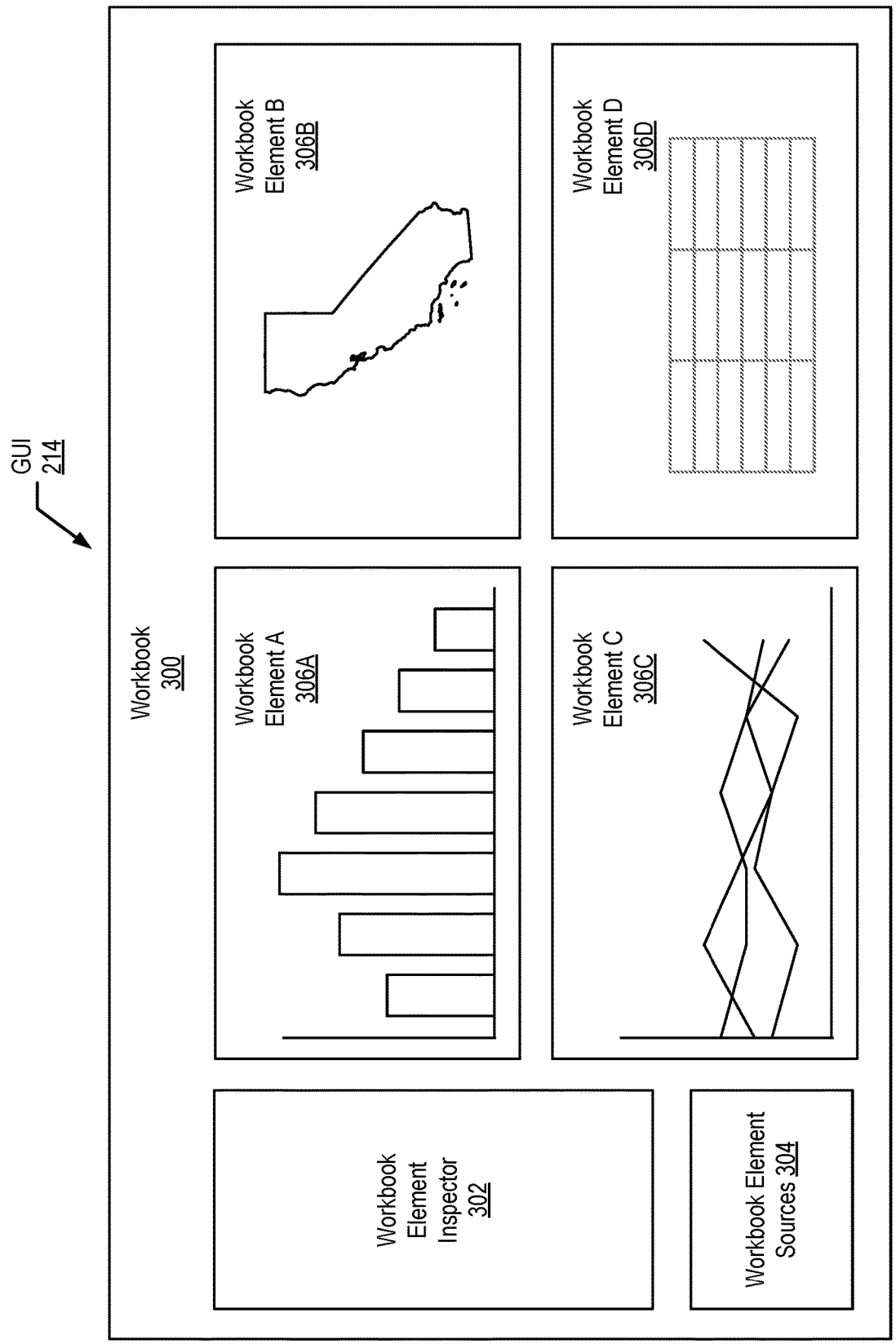
FIG. 3 sets forth a block diagram of an example system configured for audit logging for input tables on a data warehouse according to embodiments of the present invention.

FIG. 3 shows an exemplary GUI for audit logging for input tables on a data warehouse according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C)

are visualizations. Visualizations are graphical element that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
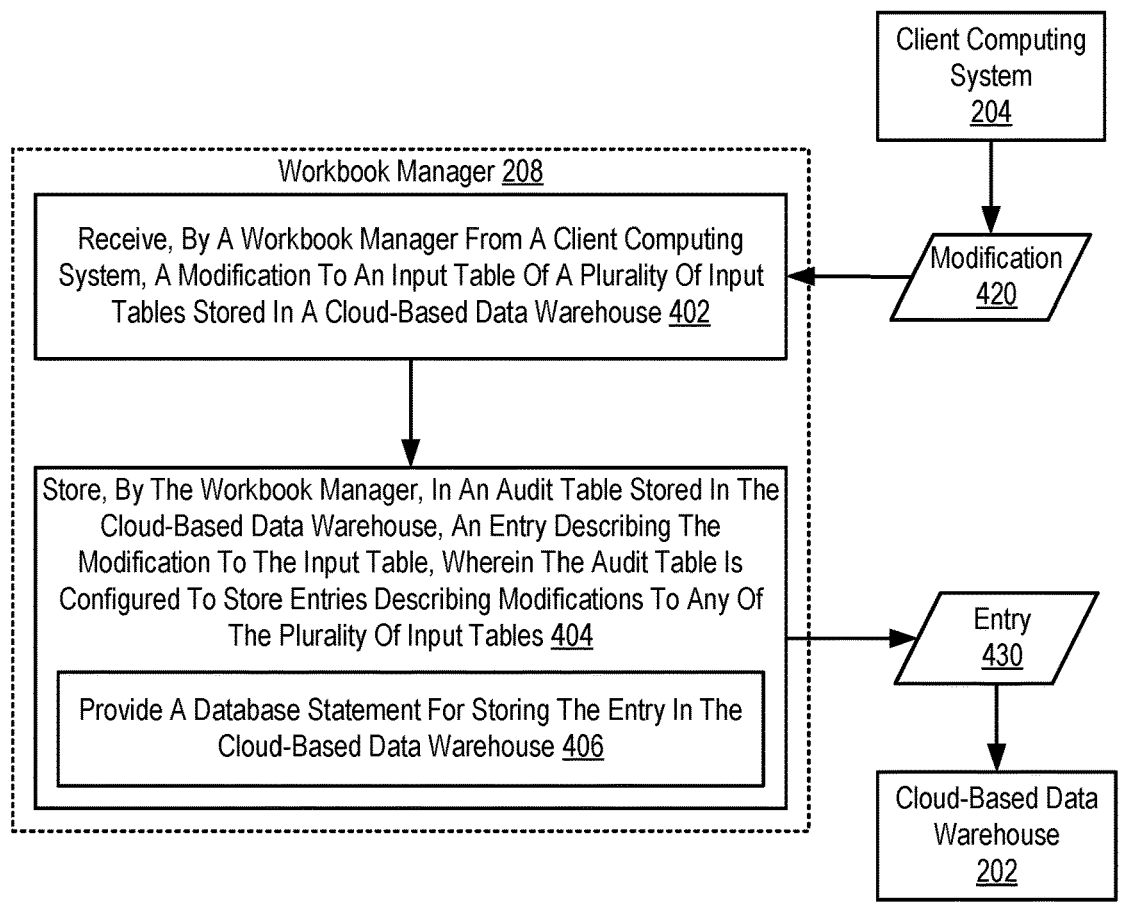
FIG. 4 sets forth a flow chart illustrating an exemplary method for audit logging for input tables on a data warehouse according to embodiments of the present invention.

For further explanation, FIG. 4 sets forth a flow chart illustrating an exemplary method for audit logging for input tables on a data warehouse according to embodiments of the present invention. The method of FIG. 4 includes receiving 402, by a workbook manager 208 from a client computing system 204, a modification 420 to an input table of a plurality of input tables stored in a cloud-based data warehouse 202. The input table is a table on the cloud-based data warehouse 202 created by a user of the workbook manager 208, such as a user of the client computing system 204. The input table is stored in the cloud-based data warehouse 202 and editable via the workbook manager 208. For example, a spreadsheet structure of a workbook may be used to view and edit the input table via the workbook manager 208. The input table allows for creation of a user input table that may be used to interact with or perform various analytics related to other tables on the cloud-based data warehouse 202, such as tables of data aggregated from various other data sources. In some embodiments, the input table may be created as an empty input table that is blank on creation (e.g., starting with no defined values for any cells). In some embodiments, the input table may be created as a linked input table that is generated or sourced based on some other data in the cloud-based data warehouse 202.

The modification 420 to the input table may include any change to the values, structure, and/or schema of the input table. For example, the modification 420 may include inputting a value into a particular cell of the input table (e.g., a particular row and column combination). As another example, the modification 420 may include modifying or deleting an existing value for a particular cell of the input table. As a further example, the modification 420 may include the creation or removal of one or more columns and/or rows in the input table.

In some embodiments, the modification 420 is received via a workbook presenting the input table on a client computing system 204. For example, a workbook client 212 on the client computing system 204 may present a GUI 214 including a spreadsheet structure or other workbook element for the input table. A modification 420 may be received via the workbook by one or more user interactions with the workbook. For example, selection of a particular cell of the spreadsheet structure may allow a user to input a value into the cell or modify or delete an existing value in the cell. As another example, a row or column may be added to the input table by selection of a particular user interface element such as a button or menu item.

In some embodiments, the modification 420 may be received as a database statement that, when provided to the cloud-based data warehouse 202, causes the input table to be modified to reflect the modification 420. In some embodiments, the modification 420 may be received as a state specification or other data describing the modification 420 and/or the input table as reflecting the modification 420. In such embodiments, the workbook manager 208 may generate a database statement for the cloud-based data warehouse 202 to modify the input table in the cloud-based data warehouse 202 based on the received modification 420. The modification 420 may include a modification 420 that a user has permissions to perform or a modification 420 that the user does not have permissions to perform.

The method of FIG. 4 also includes storing 404, by the workbook manager 208, in an audit table stored in the cloud-based data warehouse 202, an entry 430 describing the modification 420 to the input table, wherein the audit table is configured to store entries 530 describing modifications 420 to any of the plurality of input tables. The audit table serves as a log or record of any modifications 420 performed with respect to any of multiple input tables. Thus, as user-provided modifications 420 are received for any of these input tables, entries 430 describing these modifications 420 are stored in the same audit table. This allows for the audit table to serve as a unified source of information related to changes in any of the multiple input tables.

As is set forth above, the input table for which the modification 420 is received may be one of a plurality of input tables. Each of the input tables may correspond to different workbooks, different versions of a given workbook, different presentations of the data in the cloud-based data warehouse 202, and the like. Each of these multiple input tables may be related or associated in some fashion such that entries 430 describing each of their modifications 420 are stored in the same audit table. For example, in some embodiments, each of these multiple input tables may correspond to a same logical entity, such as a same user associated with the workbook manager 208, a same group of users associated with the workbook manager 208, a same customer or organization of the workbook manager 208, and the like.

In some embodiments, each of these multiple input tables may correspond to a same connection to the cloud-based data warehouse 202. As an example, each connection to the cloud-based data warehouse 202 may correspond to a different logical entity as described above. In some embodiments, a connection to the cloud-based data warehouse 202 may include a set of credentials for the cloud-based data warehouse 202. Such a set of credentials may include, for example, a user name, a password, a key or token, and the like. Accordingly, any input tables accessed or modified in the cloud-based data warehouse 202 using the same set of authentication credentials to the cloud-based data warehouse 202 may share a same audit table for entries 430 describing modifications to those input tables. As an example, the workbook manager 208 may service multiple users each having their own credentials for accessing the workbook manager 208. However, the workbook manager 208 may use its own same set of credentials to the cloud-based data warehouse 202 in order to service the requests of each of these users, including modifications 420 to input tables. Readers will appreciate that, by describing a connection to the cloud-based data warehouse 202 as including the same set of authentication credentials, a connection to the cloud-based data warehouse 202 may be considered the same across distinct network connections, sessions, and the like.

Consider an example where a first user of a first client computing system 204 provides a modification 420 to a first input table via a first workbook. An entry 430 describing this modification 420 may be stored 404 in an audit table in the cloud-based data warehouse 202. A second user of a second client computing system 204 may also provide a modification 420 to a second input table via a second workbook. Provided that these input tables are associated in some way (e.g., are accessed using the same credentials, are associated with the same logical entity), another entry 430 describing this modification 420 may be stored into the same audit table as the entry 430 describing the modification to the first input table. Similarly, were the second user to modify the first input table, an entry 430 describing that modification 420 would also be stored in the cloud-based data warehouse 202.

As the audit table includes a table in the cloud-based data warehouse 202, the entry 430 describing the modification 420 may include a row or other record of a structured table, such as a database table. Accordingly, in some embodiments, storing 404 the entry 430 in the audit table includes providing 406 a database statement for storing the entry 430 in the cloud-based data warehouse 202. The database statement may include, for example, a structured query language (SQL) statement or other database statement as can be appreciated.

The audit table may include one or more columns or other fields for storing data related to a particular modification 420. Accordingly, the entry 430 may include values for one or more of these columns or fields. In some embodiments, the one or more fields may include a field indicating a type of modification 420 performed (e.g., a change to a cell, creation or removal of a column or row, etc.). In some embodiments, the one or more fields may include an indication of a particular cell, row, or column modified by the modification 420. In some embodiments, the one or more fields may include an identifier of a particular input table modified by the modification 420. In some embodiments, where the modification 420 includes a change to a particular cell of the input table, the entry 430 may indicate a value for that cell after the modification.

Although the above discussion describes discreet fields for each of these data points related to a modification 420, in some embodiments, these data points may be combined into the same field. For example, in some embodiments, each of these data points may be encoded into a same string or other value using a markup language or other approach for delineating these data points. In some embodiments, the one or more fields may include a database statement used to effect the modification 420 in the input table in the cloud-based data warehouse 202 (e.g., an SQL statement or other database statement that, when provided to the cloud-based data warehouse 202, causes the input table to be modified according to the received modification 420).

In some embodiments, the one or more fields of the audit table may include fields describing whether a particular modification 420 was applied to the input table. As is set forth above, in some embodiments, the received modification 420 may include a modification 420 that a user of the client computing system 204 does not have permission to perform. For example, in some embodiments, the input table may be locked against any modification 420. As another example, in some embodiments, the user may lack permissions to modify the input table or to perform particular modifications 420 to the input table. Accordingly, in some embodiments, the one or more fields may include a field indicating whether or not a particular modification 420 was applied to the input table. Such a field may include a binary field indicating that the modification 420 was or was not applied, or another value as can be appreciated. In some embodiments, the one or more fields may include a field indicating why a particular modification 420 was not applied. For example, such a field may indicate that the user lacks permissions to perform the modification 420, that the input table is locked against modification 420, and the like. In this example, determinations as to whether the modification 420 may be applied to the input table may be performed by the workbook manager 208 without querying the cloud-based data warehouse 202.

In some embodiments, the modification 420 may not be applied to the input table due to an error in applying the modification 420 by the cloud-based data warehouse 202. For example, a database statement provided to the cloud-based data warehouse 202 to apply the modification 420 to the input table may receive, in response, an error message from the cloud-based data warehouse 202 indicating that the modification 420 was not applied. Such an error may be due to a variety of reasons, including temporary outages or failures in the cloud-based data warehouse 202 or other faults as can be appreciated. Accordingly, in some embodiments, the audit table may include a field indicating error codes or other data indicating why a particular modification 420 was not applied by the cloud-based data warehouse 202.

In some embodiments, the one or more fields of the audit table may include fields for metadata related to the modification 420. In some embodiments, the one or more fields may include an identifier of a user that provided the modification 420. In some embodiments, the one or more fields may include an identifier for a particular workbook through which the modification 420 was received. In some embodiments, the one or more fields may include a date and/or time at which the modification 420 was received. The one or more fields may also include other metadata fields as can be appreciated.

In some embodiments, the cloud-based data warehouse 202 may include multiple audit tables. For example, where the workbook manager 208 services multiple logical entities (e.g., multiple organizations, groups, and the like), each having their own connection to the cloud-based data warehouse 202. Accordingly, the cloud-based data warehouse 202 may store audit tables for each of these logical entities. In some embodiments, storing 404 the entry 430 describing the modification 420 may include selecting or determining a particular audit table for storing 404 the entry 430. In some embodiments, configuration parameters may define, for a particular connection to the cloud-based data warehouse 202 or logical entity, a particular audit table. In some embodiments, a table or other data structure may associate particular connections, logical entities, or input tables with their corresponding audit tables. In some embodiments, metadata for particular input tables may indicate their corresponding audit table. The audit table may be identified as a string or other value that may be inserted into a database statement such that a provided 406 database statement will cause the entry 430 to be stored in the correct table.

The audit table may be used for a variety of purposes or functions. As an example, the audit table may be used to track changes made to any input table. This may be useful in analyzing how particular users interact with a particular input table or any input table. This may also be useful in determining when particular changes were made by which users. Additionally, the audit table may be used for rolling back or undoing modifications to a single input table or multiple input tables. Moreover, the audit table provides a single, unified source for data describing changes across potentially multiple input tables.

Figure 5:
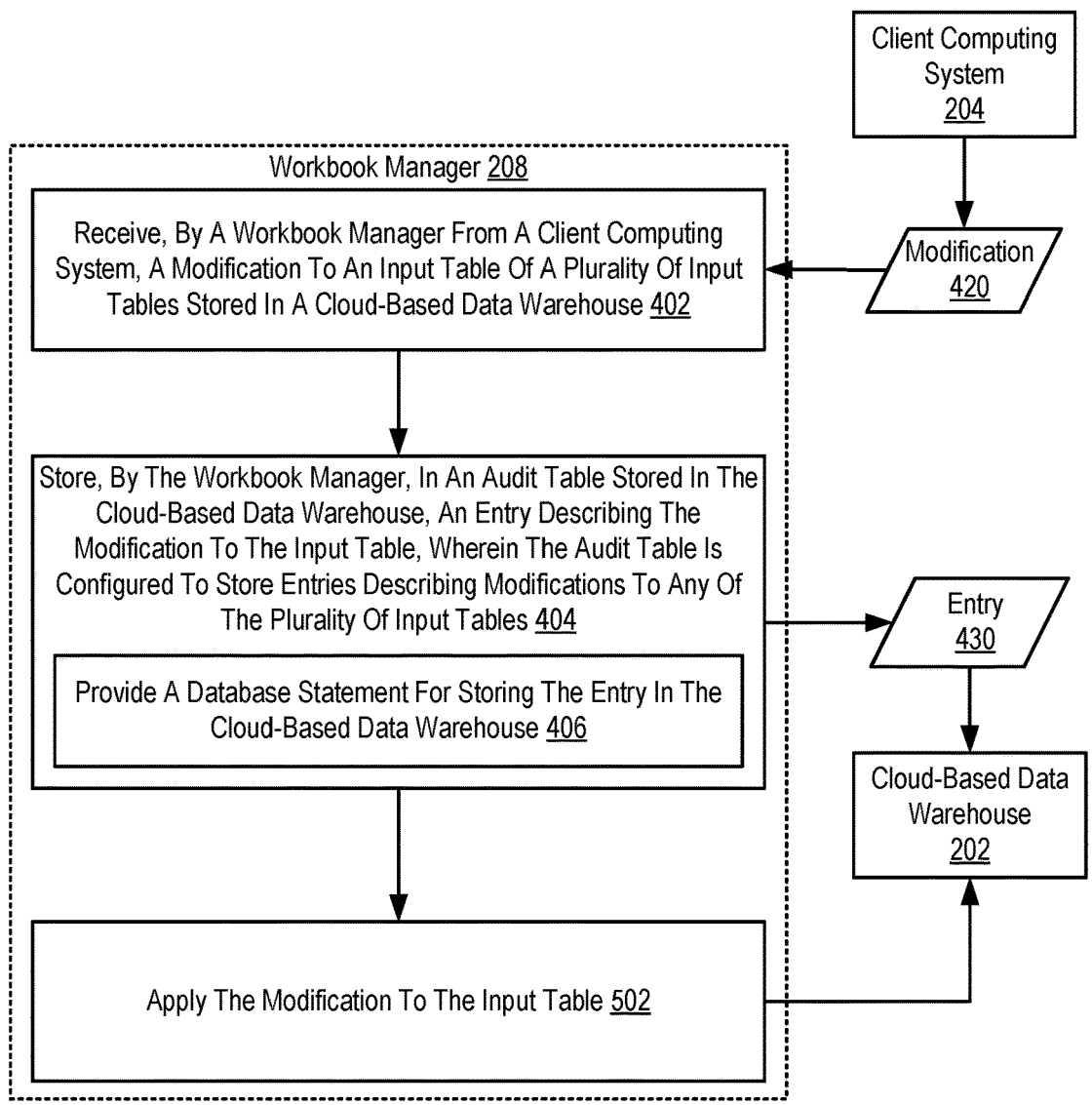
FIG. 5 sets forth a flow chart illustrating an exemplary method for audit logging for input tables on a data warehouse according to embodiments of the present invention.

For further explanation, FIG. 5 sets forth a flow chart illustrating a further exemplary method for audit logging for input tables on a data warehouse according to embodiments of the present invention that includes receiving 402, by a workbook manager 208 from a client computing system 204, a modification 420 to an input table of a plurality of input tables stored in a cloud-based data warehouse 202; and storing 404, by the workbook manager 208, in an audit table stored in the cloud-based data warehouse 202, an entry 430 describing the modification 420 to the input table, wherein the audit table is configured to store entries 430 describing modifications to any of the plurality of input tables, including providing 406 a database statement for storing the entry 430 in the cloud-based data warehouse 202.

The method of FIG. 5 differs from the method of FIG. 4, however, in that the method of FIG. 5 further includes applying 502 the modification 420 to the input table. Applying 502 the modification 420 to the input table causes the input table to reflect the modification 420 as received via the workbook. For example, applying 502 the modification 420 may cause a value of the input table in the cloud-based data warehouse 202 to be created or modified, causes a row or column of the input table in the cloud-based data warehouse 202 to be created or removed, and the like.

In some embodiments, applying 502 the modification 420 to the input table includes providing, by the workbook manager 208, a database statement (e.g., an SQL statement) to the cloud-based data warehouse 202 to modify the input table according to the modification 420. In some embodiments, where the modification 420 is received as a database statement, applying 502 the modification 420 to the input table may include providing the received database statement to the cloud-based data warehouse. In some embodiments, where the modification 420 is received as a state specification or otherwise encoded, applying 502 the modification 420 to the input table may include generating, by the workbook manager 208, a database statement for the modification 420 and providing the generated database statement to the cloud-based data warehouse 202.

In some embodiments, applying 502 the modification to the input table includes determining that the user of the client computing system 204 has permission to perform the modification 420. In some embodiments, determining that the user of the client computing system 204 has permission to perform the modification 420 may include accessing permissions associated with the input table and/or the workbook. Such permissions may indicate whether the input table can be modified and/or indications or particular modifications 420 that may be applied to the input table. Such permissions may be independent of any particular user (e.g., applicable to any user that may access the input table) or defined with respect to particular users, groups of users, and the like.

In some embodiments, determining that the user of the client computing system 204 has permission to perform the modification 420 may include accessing permissions associated with the user. Such permissions may indicate whether the user can modify any input table, whether the user can modify particular input tables, and/or particular modifications that can be performed by the user. Such permissions may be defined specifically for the user or defined with respect to a group of users including the user or a role assigned to the user. Such permissions may be used instead of or in combination with permissions associated with the input table and/or the workbook as described above.

After accessing permissions associated with the input table, workbook, and/or the user, the accessed permissions may be compared to the particular modification 420 to determine if the user has permission to perform the modification 420. If the user does have permission to perform the modification 420, the modification 420 may then be applied 502 to the input table. If the user does not have permission to perform the modification 420, in some embodiments, a notification or other indication that the user does not have permission to perform the modification 420 may be presented via the workbook. As is described above, in some embodiments, an entry 430 describing the modification 420 may be stored 404 in the audit table whether or not the user has permissions to perform the modification 420. In some embodiments, such an entry 430 may indicate that the modification 420 was not applied 502 due to the user lacking permissions to perform the modification 420.

In some embodiments where the input table includes a linked input table based on other data in the cloud-based data warehouse 202, applying 502 the modification to the input table may not modify the underlying linked data in the cloud-based data warehouse 202. After applying 502 the modification 420 to the input table, a presentation of the input table in the workbook may be updated to reflect the current state of the input table after modification. In some embodiments, a notification or other indication that the modification 420 was applied may also be presented to the user via the workbook.

In view of the explanations set forth above, readers will recognize that the benefits of audit logging for input tables on a data warehouse according to embodiments of the present invention include:

Improving the operation of the computer system by providing a unified source for information relating to modifications to input tables, increasing system utility.

Exemplary embodiments of the present invention are described largely in the context of a fully functional computer system for audit logging for input tables on a data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for audit logging for input tables on a data warehouse, the method comprising:
   receiving, by a workbook manager from a client computing system, a modification to an input table of a plurality of input tables stored in a cloud-based data warehouse; and
   generating, by the workbook manager, a database statement targeting the cloud-based data warehouse to store, in an audit table stored in the cloud-based data warehouse, an entry describing the modification to the input table, wherein the audit table is configured to store entries describing modifications to any of the plurality of input tables.

2. The method of claim 1, wherein the plurality of input tables corresponds to a same connection to the cloud-based data warehouse.

3. The method of claim 2, wherein the same connection to the cloud-based data warehouse comprises a same set of credentials for the cloud-based data warehouse.

4. The method of claim 1, wherein the plurality of input tables corresponds to a same logical entity.

5. The method of claim 1, further comprising applying, by the workbook manager, the modification to the input table.

6. The method of claim 1, wherein each of the input tables comprise a table created by the workbook manager and editable via a workbook.

7. The method of claim 1, wherein the modification to the input table is received via a workbook on the client computing system.

8. The method of claim 7, wherein the workbook presents the input table.

9. An apparatus for audit logging for input tables on a data warehouse, the apparatus comprising a computer processor, a computer memory operatively coupled to the computer processor, the computer memory having disposed within it computer program instructions that, when executed by the computer processor, cause the apparatus to carry out the steps of:
   receiving, by a workbook manager from a client computing system, a modification to an input table of a plurality of input tables stored in a cloud-based data warehouse; and
   generating, by the workbook manager, a database statement targeting the cloud-based data warehouse to store, in an audit table stored in the cloud-based data warehouse, an entry describing the modification to the input table, wherein the audit table is configured to store entries describing modifications to any of the plurality of input tables.

10. The apparatus of claim 9, wherein the plurality of input tables corresponds to a same connection to the cloud-based data warehouse.

11. The apparatus of claim 10, wherein the same connection to the cloud-based data warehouse comprises a same set of credentials for the cloud-based data warehouse.

12. The apparatus of claim 9, wherein the plurality of input tables corresponds to a same logical entity.

13. The apparatus of claim 9, wherein the computer program instructions further cause the apparatus to carry out the step of applying, by the workbook manager, the modification to the input table.

14. The apparatus of claim 9, wherein each of the input tables comprise a table created by the workbook manager and editable via a workbook.

15. The apparatus of claim 9, wherein the modification to the input table is received via a workbook on the client computing system.

16. A computer program product for audit logging for input tables on a data warehouse, the computer program product disposed upon a computer readable medium, the computer program product comprising computer program instructions that, when executed, cause a computer to carry out the steps of:
   receiving, by a workbook manager from a client computing system, a modification to an input table of a plurality of input tables stored in a cloud-based data warehouse; and
   generating, by the workbook manager, a database statement targeting the cloud-based data warehouse to store, in an audit table stored in the cloud-based data warehouse, an entry describing the modification to the input table, wherein the audit table is configured to store entries describing modifications to any of the plurality of input tables.

17. The computer program product of claim 16, wherein the plurality of input tables corresponds to a same connection to the cloud-based data warehouse.

18. The computer program product of claim 16, wherein the same connection to the cloud-based data warehouse comprises a same set of credentials for the cloud-based data warehouse.

* * * * *